June 17, 1969 KOJI TAKATA 3,450,234

DISC BRAKE DEVICE FOR VEHICLES

Filed Oct. 13, 1967

United States Patent Office 3,450,234
Patented June 17, 1969

3,450,234
DISC BRAKE DEVICE FOR VEHICLES
Koji Takata, Amagasaki-shi, Japan, assignor to Sumitomo Electric Industries, Ltd., Higashi-ku, Osaka, Japan
Filed Oct. 13, 1967, Ser. No. 675,121
Int. Cl. F16d 55/00
U.S. Cl. 188—73                 6 Claims

ABSTRACT OF THE DISCLOSURE

A disc brake device having a stationary pin extending through metal plates provided on the back of friction pads, and a U-shaped stop ring mounted on the pin so as to restrain the movement of the back metal plates in the axial direction of the pin. The relation between the stop ring and the back metal plates is such that the stop ring prevents direct contact between the back metal plates and the brake disc to thereby avoid possible damage to the brake disc due to wear of the friction pads beyond an allowable limit of wear.

---

Figure 1:
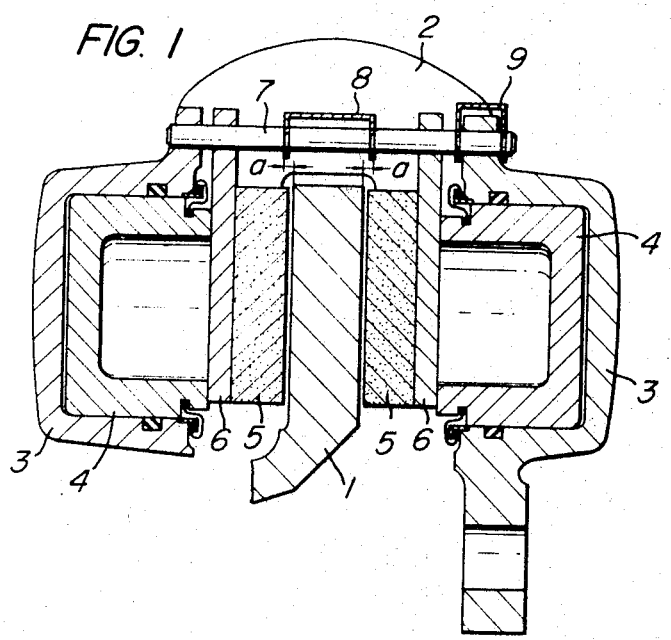

This invention relates to a disc brake device.

It is the primary object of the present invention to provide a disc brake device having means which can indicate the fact that the friction pad has been worn out beyond its allowable limit of wear.

Another object of the present invention is to provide a disc brake device having means which can positively protect the brake disc against any damage which may result from the direct contact between the brake disc and the back metal plate of the friction pad when the friction pad has been excessively worn out beyond its allowable limit of wear.

Figure 3:
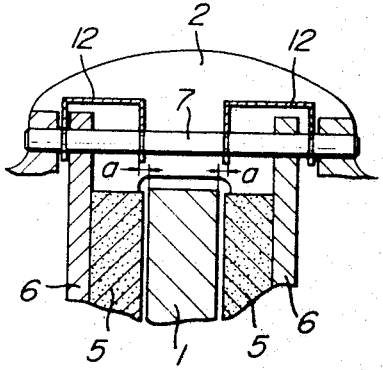
Figure 2:
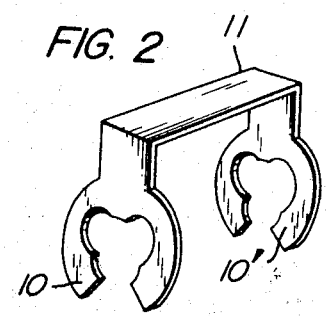

The above and other objects, advantages and features of the present invention will become apparent from the following description with reference to the accompanying drawings:

In the drawings:

FIGURE 1 is a sectional view of an embodiment of the disc brake device according to the present invention;
FIGURE 2 is a perspective view of a stop ring used in the device shown in FIGURE 1; and FIGURE 3 is a sectional view showing another embodiment of the present invention.

FIGURE 1 illustrates a disc brake of the most commonly used type to which the present invention is applied. The disc brake includes therein friction pads 5 disposed on opposite sides of a disc 1 which revolves in a unitary relation with the wheels, and cylinders 3 and pistons 4 for forcing these friction pads 5 against the disc 1. The cylinders 3 containing therein the pistons are connected to a stationary part of the vehicle by means of a caliper 2.

The pad 5 is movable only in its axial direction, its movement in the circumferential direction being restrained by the caliper 2 and its radial movement being restrained by a plurality of pins 7.

The pad 5 is backed by a metal plate 6, and each pin 7 engages with a hole or groove provided in the back metal plate 6. The pin 7 engages also with a hole provided in the caliper or cylinder, and its movement in the axial direction is restrained by a stop means such as a split pin, stop ring, or clip. In FIGURE 1, such stop means is shown as a U-shaped stop ring 9.

According to the present invention, another U-shaped stop ring 8 having its leg portions spaced a distance somewhat wider than the width of the disc 1 is fixed to the middle portion of each pin 7. The stop ring 8 may preferably be mounted on the pin 7 in such a way that the outer faces of its leg portions are spaced respective distances $a$ (that is, distances corresponding to the wearing or serviceable limit of the friction pads 5) from the opposite surfaces of the disc 1 adapted to frictionally engage the friction pads 5.

As the friction pad 5 gradually wears out, the back metal plate 6 gradually approaches the disc 1 to an extent that, in the case of an ordinary disc brake device, the friction material of the pad 5 is eventually completely consumed and the back metal plate 6 is brought in direct contact with the disc. If such a direct contact takes place, the metal of the back metal plate may be fused to attach to the disc and thereby the replacement of the disc becomes necessary. Furthermore, the heat generated in the disc may be transmitted to the brake oil via the back metal plate and the metal piston to cause the vaporization of the brake oil. With an ordinary disc brake, therefore, the remaining portion of the friction material of the pad 5 must be inspected at suitable intervals in order that the friction pad can be replaced by a new one before the back metal plate is brought in direct contact with the disc. However, there are many instances where many of vehicle drivers fail to properly make such an inspection.

According to the present invention, as the friction material of the pad 5 gradually wears out, the back metal plate 6 comes in contact with the stop ring 8 before it is brought into direct contact with the disc 1. When one end of the back metal plate 6 contacts the stop ring 8, the force transmitted from the piston 4 to the friction pad 5 becomes non-uniform and causes a decrease in the braking efficiency, excessive partial wear on the friction pad, etc., and from the occurrence of such unusual conditions the driver can easily know that the friction pad must now be replaced. Thus, the brake disc 1 can be protected against any damage which may result from the direct contact between the brake disc 1 and the back metal plate 6 of the friction pad 5 when the friction pad 5 has been excessively worn out beyond its allowable limit of wear.

FIGURE 2 shows one form of such a stop ring. It is substantially U-shaped and has two legs 10 and 10' having aligned cutouts snugly fitting in the grooves on the pin 7 and a portion 11 connecting these legs. The ring of this structure is easy to mount and dismount, is not likely to be lost, has a light weight, and can be manufactured at a low cost.

FIGURE 3 shows another embodiment of the present invention in which like reference numerals are used to denote like parts appearing in FIGURE 1. In this embodiment, two U-shaped stop rings 12 similar to the stop ring 8 shown in FIGURE 1 are employed and are so arranged as to stop the movement of a pin 7 in the axial direction and serve at the same time as stoppers for back metal plates 6. In this case, each stop ring 12 may preferably be mounted on the pin 7 in such a way that the inner face of its inner leg portion is spaced a distance $a$ (that is, a distance corresponding to the wearing or serviceable limit of the friction pad 5) from the corresponding surface of the disc 1 adapted to frictionally engage the friction pad 5.

I claim:
1. A disc brake device having a rotary disc drivingly connected to a rotary member, a pair of friction pads disposed on opposite sides of said disc for frictional engagement with said disc, a back metal plate mounted on the back face of each said friction pad, and pressing means engaging said back metal plates for releasably pressing said friction pads against said disc; said disc brake device comprising at least one pin fixedly disposed adjacent to the periphery of said disc extending through said back metal plates in the direction parallel to the axis of said disc, said pin being provided with at least two grooves thereon arranged on opposite sides of said disc in equi- distantly spaced relation from the opposite surfaces of said disc respectively, and at least one U-shaped stop ring mounted on said pin having two leg portions, said leg portions having aligned cutouts snugly fitting in said grooves on said pin, said leg portions disposed near the disc having lateral surfaces remote from the opposite surfaces of the disc and spaced from an equal distance corresponding to the serviceable wearing limit of said friction pads from said opposite surfaces of the disc.

2. A disc brake device having a rotary disc drivingly connected to a rotary member, a pair of friction pads disposed on opposite sides of said disc for frictional engagement with said disc, a back metal plate mounted on the back face of each said friction pad, and pressing means engaging said back metal plates for releasably pressing said friction pads against said disc; said disc brake device comprising at least one guide pin fixedly disposed adjacent to the priphery of said disc and slidably extending through said back metal plates in the direction generally parallel to the axis of said disc, and at least one generally U-shaped stop ring having a pair of spaced leg portions, said leg portions having aligned cutouts snappingly and removably engaged on said pin to prevent relative movement between the ring and the pin longitudinally of the latter, said leg portions being disposed longitudinally of the pin for engaging at least one of said back metal plates to limit the movement of the plate longitudinally of the pin to thereby prevent the plate from moving closer to the disc than the serviceable wearing limit of said friction pads.

3. A disc brake device as set forth in claim 2 wherein each leg portion comprises a generally U-shaped snap bracket having a pair of spaced generally arcuate leg segments defining said cutout, said leg segments snappingly straddling the pin which is disposed in the cutouts.

4. A disc brake device as set forth in claim 2 wherein said ring includes a bight section interconnecting its leg portions and maintaining the spacing of the same at a distance slightly greater than the width of said disc, said leg portions being disposed on opposite sides of the disc for limiting the movement of corresponding plates toward the disc.

5. A disc brake device as set forth in claim 2 wherein is included a pair of said rings, one for each plate, said rings being spaced longitudinally of the pin a distance slightly greater than the width of the disc and disposed on opposite sides of the disc.

6. A disc brake device as set forth in claim 2 wherein is provided a pair of spaced grooves in the pin, each leg portion being received in a corresponding groove, with the pin in the cutout.

References Cited
UNITED STATES PATENTS 3,294,205　12/1966　Schanz _____ 188—205

FOREIGN PATENTS 1,218,231　6/1966　Germany.

GEORGE E. A. HALVOSA, *Primary Examiner.*